(12) United States Patent
Håkansson

(10) Patent No.: US 6,186,304 B1
(45) Date of Patent: Feb. 13, 2001

(54) TELESCOPIC CHUTE ASSEMBLY

(76) Inventor: Torsten Ingemar Håkansson, Triangelvägen 23, 562 91 Månsarp (SE)

(*) Notice: Under 35 U.S.C. 154(b), the term of this patent shall be extended for 0 days.

(21) Appl. No.: 09/560,483

(22) Filed: Apr. 28, 2000

Related U.S. Application Data

(63) Continuation-in-part of application No. 09/024,577, filed on Feb. 17, 1998, now abandoned.

(51) Int. Cl.⁷ .................................................. B65G 11/00
(52) U.S. Cl. ............................ 193/6; 193/25 A; 193/33
(58) Field of Search ........................... 193/25 C, 6, 5, 193/25 A, 33

(56) References Cited

U.S. PATENT DOCUMENTS

| | | |
|---|---|---|
| 176,700 | 4/1876 | Sible . |
| 556,934 | 3/1896 | Koller . |
| 2,968,382 | 1/1961 | Oury . |
| 3,157,262 | 11/1964 | Chapdelaine . |
| 3,334,872 | 8/1967 | Hansen et al. . |
| 3,774,741 | 11/1973 | Johnson . |
| 4,047,604 | 9/1977 | Daoust et al. . |
| 4,073,318 | 2/1978 | Close et al. . |
| 5,015,122 | 5/1991 | Combes . |
| 5,035,313 | 7/1991 | Smith . |
| 5,178,252 | 1/1993 | Smith . |
| 5,192,178 | 3/1993 | Silbernagel . |
| 5,551,776 | 9/1996 | Zimmerman . |

*Primary Examiner*—Christopher P. Ellis
*Assistant Examiner*—Joe Dillon, Jr.
(74) *Attorney, Agent, or Firm*—Fasth Law Offices; Rolf Fasth

(57) ABSTRACT

The telescopic chute assembly may be used to discharge cement from a discharge end of a concrete mixer mounted on a truck. The chute assembly has several telescopic chute sections for receiving the material from the mixer. The chute sections have a plurality of aligned flat strips that are attached to one another at an angle to form an elongate trough-shaped body to reduce the friction between the cement and the chute sections.

14 Claims, 3 Drawing Sheets

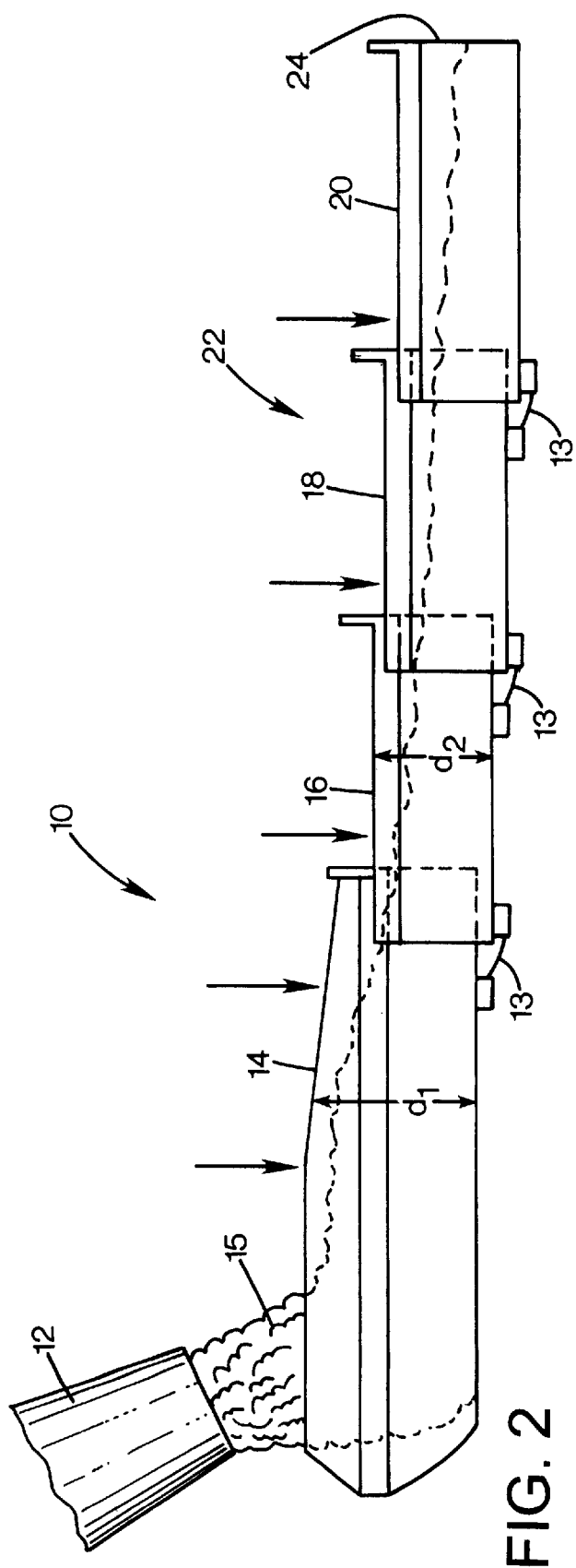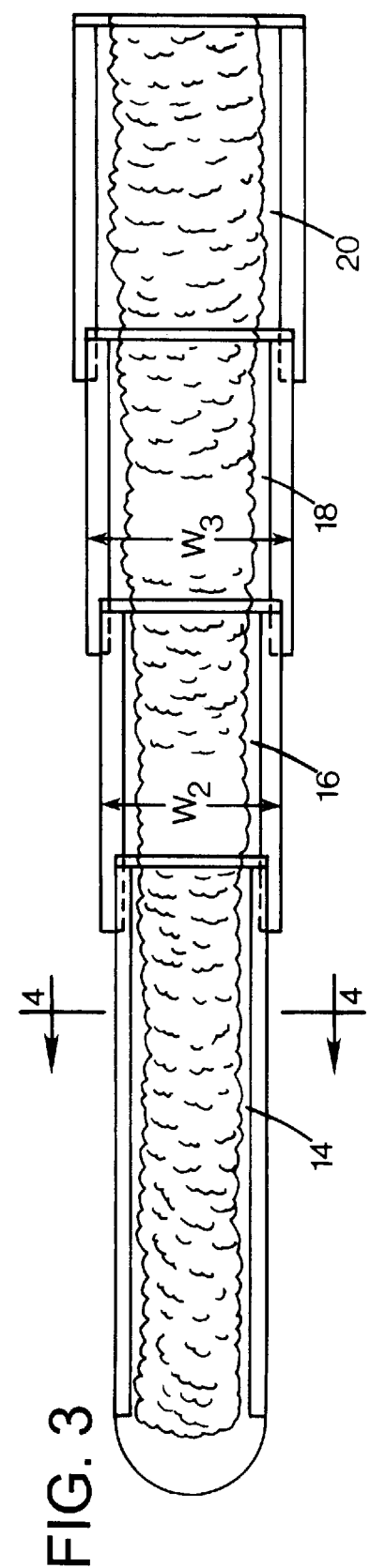

TELESCOPIC CHUTE ASSEMBLY

PRIOR APPLICATION

This is a continuation-in-part patent application of U.S. patent application Ser. No. 09/024,577, now abandoned, filed Feb. 17, 1998.

TECHNICAL FIELD

The invention relates to a telescopic chute assembly, particularly to a remote controlled chute assembly for discharging cementitious material from a mixer truck.

BACKGROUND INFORMATION AND SUMMARY OF THE INVENTION

Many prior art chutes are mounted at the rear or discharge end of a concrete mixer and are swingable laterally as well as upwardly, so as to direct ready mix concrete and the like wherever needed within a limited radius around the discharge end of a mixer truck or a transit concrete truck.

Such chutes are often made up of a series of telescopically fitted sections that are adapted to be contracted into a compact form so that, when mounted at the rear end of a transit mixer truck, the sections which are nested into one another and are well within the width of the transit mixer and do not extend beyond the sides thereof. When the sections are extended, they are capable of conveying the concrete discharged from the mixing drum to a substantial distance and within a convenient area.

However, it has been found that when the chute sections are very long, the cement does not seem to flow well due to undesirable suction forces that are created between the concrete and the smooth inner wall of the chute sections. Therefore, one object of the present invention is to provide a telescoping conveying chute assembly for transit concrete mixer, which can automatically expand to an appreciable distance from the mixer to quickly and effectively deposit the concrete mixture into many positions despite the substantial length of the chute sections.

The present invention is a telescopic chute assembly for discharging cementitious material from a discharge apparatus that has a rotatable storage drum. The chute assembly has a first chute section for receiving the material from the drum. The first chute section has a first outlet end. A second chute section extends longitudinally between a second inlet end and a second outlet end ea that the second inlet end may be slidably attached to the first outlet end of the first chute section to receive the cementitious material from the first chute section A third chute section may comprise a body of complemental cross-sectional shapes to the second chute section and may be of a larger size so as to telescopically slide over the second chute section and be movable to extend outwardly from the second chute section. Each of the first, second and third chute sections preferably comprises a plurality of aligned flat strips that are integrally buckled or attached to one another at an angle to form an elongate trough-shaped body. The angle promotes the formation of air bubbles between the chute sections to reduce any undesirable suction forces and to reduce the friction between the flowable cementitious material and the grooved inner surface of the chute sections.

BRIEF DESCRIPTION OF THE DRAWINGS

FIG. 2 is a side view of the chute assembly of the present invention;

FIG. 3 is a top view of the chute assembly of the present invention; and

DETAILED DESCRIPTION

Figure 1:
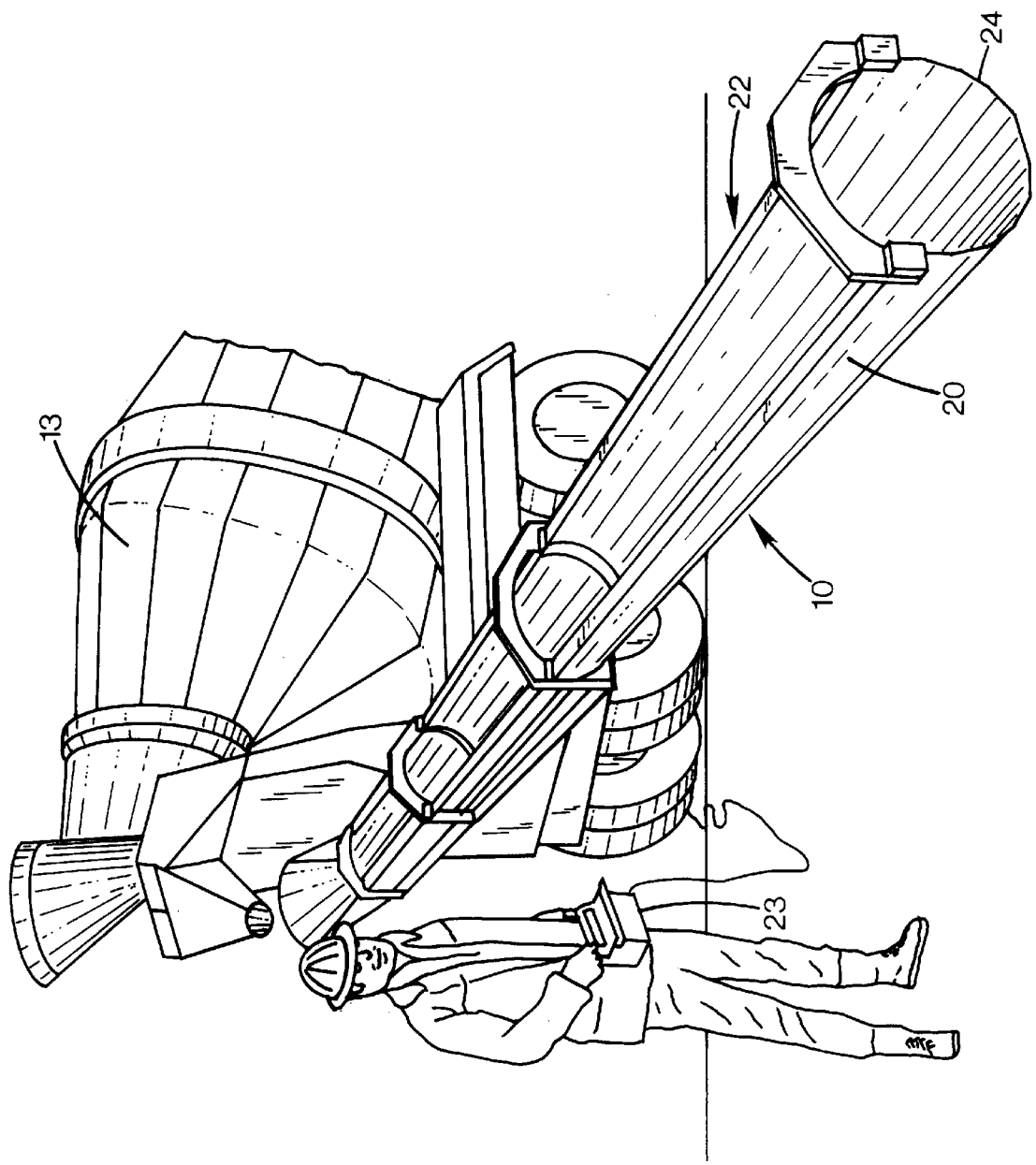
FIG. 1 is a perspective view of the chute assembly of the present invention attached to a mixer truck.

With reference to FIGS. 1–4, the telescopic chute assembly 10 of the present invention has a pivotable connection mechanism 12 that is attached to the back of a mixer truck 13 for discharging a material such as a cementitious material 15 that is received from a rotatable drum on the mixer truck 13. The connection mechanism 12 may be used to either fold and attach the chute assembly 10 along the mixer truck 13 to make the chute assembly 10 safe for transportation. When the mixer truck 13 has reached the construction site, the connection mechanism 12 may move the chute assembly lo outwardly until the chute assembly 10 is in a suitable position relative to the length of the mixer truck 13.

A relatively narrow but deep first chute section 14 may be pivotally attached to the connection mechanism 12. Because most cementitious materials have a very high viscosity, the relatively deep but narrow first chute section 14 promotes the flow of the cement (through "self pressure",) as the cement leaves the rotatable drum of the mixer truck 13, The chute section 14 may be moved sideways, upwardly and downwardly relative to the mixer truck 13. The first chute section 14 may be slidably connected to a second chute section 16 so that the second chute section 16 may slide into and out from the first chute section 14 in a telescopic manner to adjust the overall length of the chute assembly 10. The first chute section 14 has a depth $d_1$, that is greater than a depth $d_2$ of the second chute section. The second chute section 16 way be slightly wider but more shallow than the first chute section 14 so that the second sleeve section 16 may be slidably attached to an outside of the first sleeve section 14. Similarly, the second chute section 16 may be slidably inserted into a third chute section 18 that in turn may be slidably inserted into a fourth chute section 20. The third chute section 18 has a width $w_3$ that is wider than a width $w_2$ of the second chute section 16. In this way, the chute sections become gradually wider but more shallow so that they together form a telescoping chute assembly 22 that may be moved from a nested and retracted position to an extended position by telescopically extending a few or all the chute sections away from the mixer truck 13 and from one another.

An important feature of the present invention is that the chute sections 14, 16, 18 and 20 have round bottom sections that do not have a perfectly round smooth inner surface. It has been found that very smooth surfaces tend to cause unexpected and undesirable suction between the cementitious material and the inner surface of the chute sections that slows down the flow of the cementitious material through the chute sections.

Figure 4:
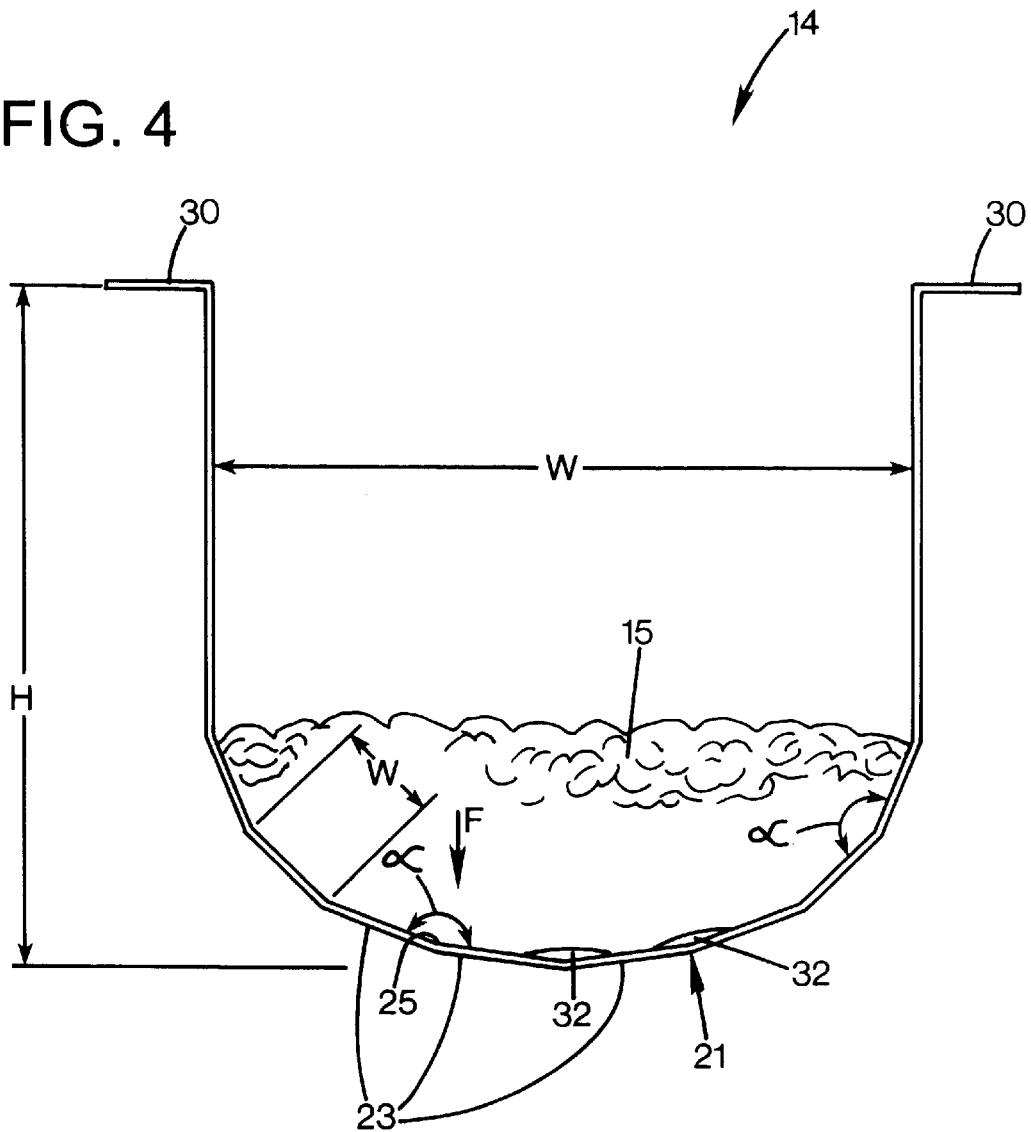
FIG. 4 is a cross-sectional view along line 4—4 in FIG. 3.

Another important feature of the present invention is that the chute section 14 has a height H that is greater than a width $W_4$, as best seen in FIG. 4. The specific gravity or weight of the cement results in a downwardly directed force F that is focused on the center of the curved and buckled sections 23. As described below, the force F easily overcomes any friction forces between the cement and the inner surface of the chute sections so that the weight of the cement is sufficient to start the flow of the cement that rests of air pillows formed between the cement and the buckled surface of the chute sections. In this way, the flow of the cement may self-start.

The combination of a round bottom section 21 that is formed by the plurality of buckled flat strips 23 and the height H that is about the same or greater than the width $W_4$, has the surprising affect that the cement flows at least 20% is easier in the chute sections compared to conventional chute sections. In a test, it was found that the cement started flowing at a commercially acceptable speed at an inclination angle of about 16° or less between the chute sections and the horizontal ground. In conventional chute sections, the cement did not start flowing until the chute sections were inclined at an angle of between 20–30° or more depending upon the type of chute sections. The flatter the chute sections, the higher the inclination angle required for the cement to start flowing.

As shown in FIG. 4, the chute section 14 has the round bottom section 21 that comprises a plurality of elongate flat strips 23 that are attached to one another or integrally buckled at an angle alpha at grooves 25 to form longitudinal grooves that extend along the full length of the chute sections 14, 16, 18 and 20, The flat strips 23 are substantially flat and each strip has a width W that is preferably about 10–20 millimeters wide and extends along the full length of each chute section. More preferred, the strips are about 13–17 millimeters wide. Most preferred, the strips are about 14.4 millimeters wide so that a suitable amount of air bubbles may be formed in voids 32 that are defined between the cement and the flat strips 23 at the grooves 25 where the strips are bent, integrally buckled or attached to one another. The air bubbles in the voids 32 substantially reduce the friction between the flowable cement 15 and the chute sections to an unexpected extent. The voids 32 are formed because most rocks in cement are about 14–16 millimeters in diameter and the strips are form an angle relative to one another. It smaller rocks are used, the width of the flat stripe is preferably smaller than the diameter of the rocks so that the desirable voids are created. If the width of the strips is greater than the diameters of the rocks used in the cement, the friction increases due to increased suction between the cement and the inside surface of the chute sections. If the width of the strips is substantially smaller than the diameter of the rocks, then the suction increases also that in turn results in increased friction. Therefore, the width of the strips should be about the same as the diameter of the rocks to reach the surprisingly low friction because air is trapped between the rocks of the cement and the buckled strips. The trapped air tends to lift cement from the inner surface of the chute sections that substantially reduces the friction therebetween.

The obtuse angle alpha is preferably between about 1.0 degrees and 3.0 degrees. More preferred, the angle alpha is between about 1.5 degrees and about 2.3 degrees. Most preferred, the angle alpha is about 1.9 degrees. It is to be understood that other angles may be used depending upon, among other things, the size of the rocks in the cement and the size of the chute. Instead of using buckled and aligned strips, the chute sections may have sufficiently wide and shallow grooves that extend along the chute sections to permit the formation of an air bubble between the flowable cementitious material and the grooves defined along the inner walls of the chute sections.

Each chute section has a pair of upper support edges 30 that support and direct the chute sections when the sections are extended and retracted relative to the mixer truck and relative to one another.

Another important feature is that the chute assembly 22 may be remotely controlled by a control unit 23 to move the chute assembly vertically and horizontally. The length of the chute assembly 22 may also be remotely controlled so that an end portion 24 of the chute assembly 22 can be precisely positioned.

In operation, the operator may activate the chute assembly 22 with the control unit 23 to that the connection mechanism 12 moves the chute assembly 22 to a suitable position relative the mixer truck 13. The chute assembly 22 is still in a retracted nested position. The length of the chute assembly 22 may be determined with the control unit 23 by permitting the chute sections to telescopically extend and retract, with a powered mechanism or receiver unit 13 that is attached to at least one of the chute sections, while adjusting the chute assembly 22 sideways, upwardly and downwardly until the end portion 24 is positioned exactly where it is desirable to deposit the cementitious material 15. The rotatable drum is then opened so that the cementitious material 15 may be discharged from the drum and allowed to flow through the chute sections. Because the chute sections comprise a plurality of buckled angle sections, air is permitted to form between the flowing cement 15 and the inner surface of the chute sections so that the cement may flow through the chute sections with minimal friction. When a sufficient amount of cement has been discharged, the drum is closed and the chute assembly 22 is retracted into a nested position and the connection mechanism 12 shifts the chute assembly 22 forwardly along the side of the mixer truck 13. The chute assembly 22 is then firmly attached to the mixer truck 13 so that the mixer truck 13 can safely transport the remaining cement to another site, if necessary.

While the present invention has been described in accordance with preferred compositions and embodiments, it is to be understood that certain substitutions and alterations may be made thereto without departing from the spirit and scope of the following claims.

I claim:

1. A telescopic chute assembly for discharging material from a discharge apparatus having a storage reservoir, comprising:

a first chute section for receiving the material from the reservoir, the first chute section having a first outlet end, the first chute section having a first width and a first height, the first height being at least as great as the first width;

a second chute section extending longitudinally between a second inlet end and a second outlet end, the second inlet end being slidably attached to the first outlet end of the first chute section to receive material from the first chute section;

a third chute section comprising a body of a complemental cross-sectional shape to the second chute section and being of larger size so as to telescopically slide over the second chute section and movable to extend outwardly from the second chute section, the third chute section extending longitudinally between a third inlet end and a third outlet end;

each of the first, second and third chute section comprising a plurality of aligned flat strips that are disposed relative to one another at an obtuse angle to form a rounded bottom section that comprises a plurality of buckled angle sections of an elongate trough-shaped body; and means for improving a fluid flow of the discharging material by reducing a friction formed between the buckled angle sections and the discharging material.

2. The telescopic chute assembly according to claim 1 wherein the angle is between about 1.5 degrees and about 2.3 degrees.

3. The telescopic chute assembly according to claim 1 wherein each flat strip hap a width that is between about 10 millimeter and about 20 millimeters.

4. The telescopic chute assembly according to claim 1 wherein each flat strip has a width that is between about 13 millimeter and about 16 millimeters.

5. The telescopic chute assembly according to claim 1 wherein each flat strip has a width that is between about 14 millimeter and about 15 millimeters.

6. The telescopic chute assembly according to claim 1 wherein the flat strips are integrally attached to one another.

7. The telescopic chute assembly according to claim 1 wherein a powered mechanism is attached to at least one of the chute sections for actuating inward and outward sliding movement of the chute sections between a generally fully retracted and a partially extended position.

8. The telescopic chute assembly according to claim 1 wherein the first grooves are defined between aligned flat strips that are disposed relative to one another to form an obtuse angle.

9. The telescopic chute assembly according to claim 8 wherein each flat strip has a width that is between about 13 millimeter and 16 millimeters.

10. The telescopic chute assembly according to claim 8 wherein each flat strip has a width that is between about 14 millimeter and 15 millimeters.

11. The telescopic chute assembly according to claim 8 wherein the flat strips are integrally attached to one another.

12. A telescopic chute assembly for discharging material from a discharge apparatus having a storage reservoir, comprising:

a first chute section for receiving the material from the reservoir, the first chute section having an upwardly facing curved inner wall that forms a rounded bottom portion, the curved inner wall having a plurality of elongate first grooves defined therein and extending from a first inlet end to a first outlet end of the first chute section;

a second chute section extending longitudinally between a second inlet end and a second outlet end, the second inlet end being slidably attached to the first outlet end of the first chute section to receive material from the first chute section, the second chute section having a plurality of elongate second grooves defined therein, the second grooves being aligned with the first grooves;

a third chute section comprising a body of complemental cross-sectional shapes to the second chute section and being of larger size so as to telescopically slide over the second chute section and movable to extend outwardly from the second chute section, the third chute section extending longitudinally between a third inlet end and a third outlet end;

a receiver unit attached to the chute assembly for receiving a signal to extend or retract the second and third chute sections relative to the first chute section;

a remote switching unit adapted to transmit the signal to the receiver unit to activate the receiver unit to extend or retract the second and third chute sections; and means for improving a fluid flow of the discharging material by reducing a friction formed between the buckled angle sections and the discharging material.

13. The telescopic chute assembly according to claim 12 wherein the third chute section has a width that is wider than a width of the second chute section.

14. The telescopic chute assembly according to claim 12 wherein the first chute section has a depth that is deeper than a depth of the second chute section.

* * * * *